United States Patent [19]

Faigle et al.

[11] Patent Number: 5,242,191
[45] Date of Patent: Sep. 7, 1993

[54] TETHERED AIR BAG COVER

[75] Inventors: Ernst M. Faigle, Dryden; Joseph F. Ziomek, W. Bloomfield; Jack A. Phillion, Rochester Hills, all of Mich.

[73] Assignee: TRW Vehicle Safety Systems Inc., Lyndhurst, Ohio

[21] Appl. No.: 642,802

[22] Filed: Jan. 18, 1991

[51] Int. Cl.⁵ .............................................. B60R 21/16
[52] U.S. Cl. .................................. 280/728; 280/731; 280/732
[58] Field of Search ............... 280/728, 730, 731, 732, 280/743

[56] References Cited

U.S. PATENT DOCUMENTS

| | | | |
|---|---|---|---|
| 3,514,124 | 5/1970 | Richardson | 280/723 |
| 3,624,810 | 11/1971 | Hass | 280/738 |
| 3,767,229 | 10/1973 | Cain | 280/732 |
| 3,774,936 | 11/1973 | Barnett et al. | 280/730 |
| 3,822,894 | 7/1974 | Muller et al. | 280/731 |
| 3,938,826 | 2/1976 | Giorgini et al. | 280/738 |
| 3,944,250 | 3/1976 | Wulf et al. | 280/732 |
| 3,945,665 | 3/1976 | Tsutsumi et al. | 280/731 |
| 3,968,979 | 7/1976 | Schiesterl | 280/731 |
| 3,982,774 | 9/1976 | Ivashuk et al. | 280/737 |
| 4,449,728 | 5/1984 | Pilatzki | 280/731 |
| 4,696,705 | 9/1987 | Hamilton | 149/21 |
| 4,810,005 | 3/1989 | Fohl | 280/732 |
| 4,842,300 | 6/1989 | Ziomek et al. | 280/732 |
| 4,964,653 | 10/1990 | Parker | 280/732 |

FOREIGN PATENT DOCUMENTS 3843686  6/1990  Fed. Rep. of Germany ...... 280/743

Primary Examiner—Robert J. Oberleitner
Assistant Examiner—Paul Dickson
Attorney, Agent, or Firm—Calfee Halter & Griswold

[57] ABSTRACT

A vehicle air bag module includes a new and useful tether structure for incorporating a cover into the air bag module. The tether structure enables the cover to separate from the remainder of the module but remain tethered to the air bag as the air bag is being deployed from the module.

27 Claims, 4 Drawing Sheets

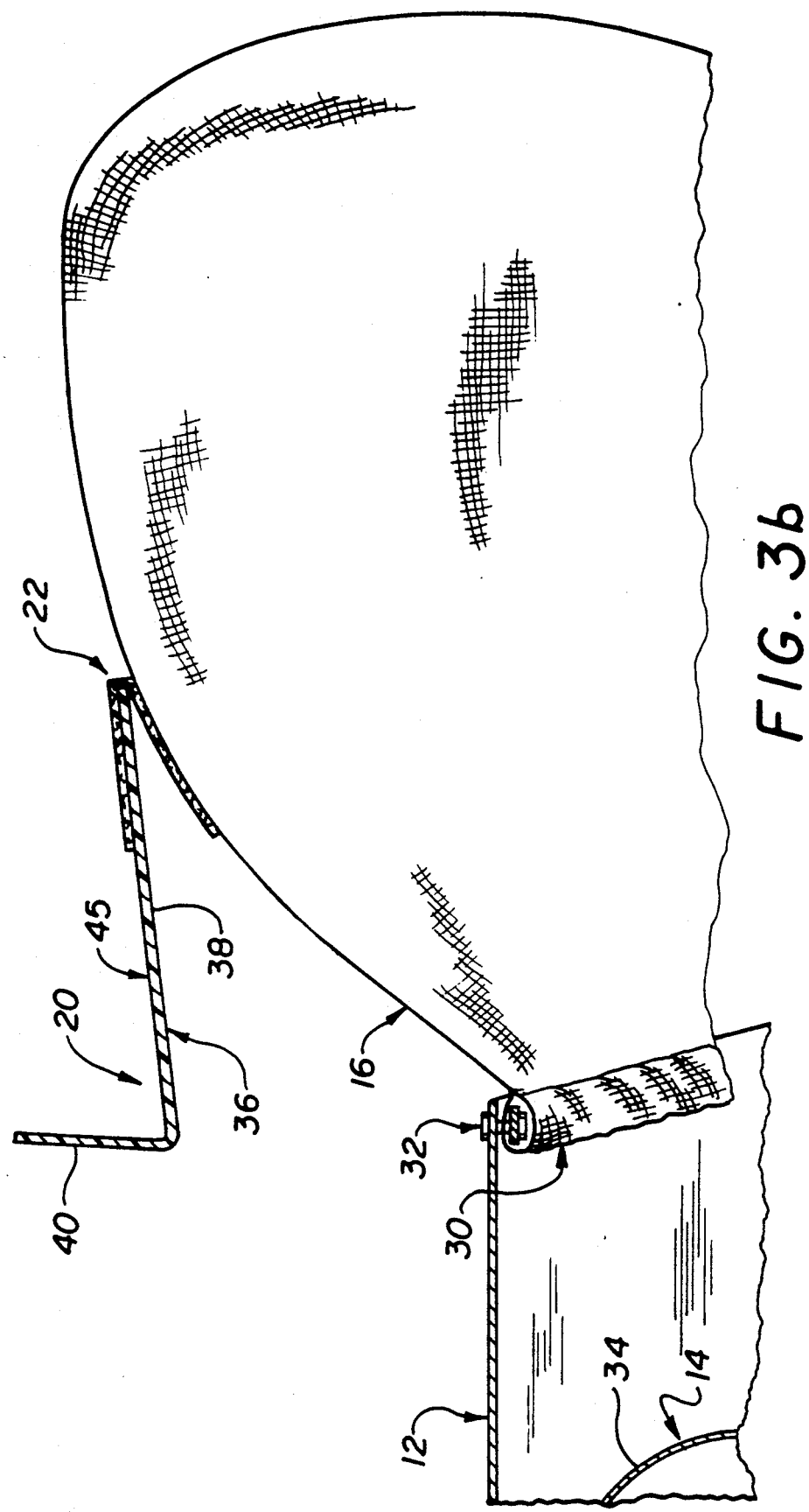

TETHERED AIR BAG COVER

TECHNICAL FIELD

The present invention relates to a vehicle air bag module and particularly to new and useful tether structure for incorporating a cover into the air bag module. The tether structure enables the cover to separate from the remainder of the module but remain tethered to the air bag as the air bag is being deployed from the module.

BACKGROUND

A vehicle air bag module is a complete unit which is assembled apart from the vehicle and then coupled as a unit to the vehicle. Typically, an air bag module includes (i) a receptacle, (ii) an inflator and a folded air bag disposed in the receptacle, and (iii) a cover attached to the receptacle to complete an enclosure for the inflator and folded air bag. When the air bag module is coupled to a vehicle, the receptacle acts as a reaction device which transmits reaction forces to the vehicle structure. The cover forms a part of the vehicle dashboard or steering wheel cover.

When coupled to a vehicle, an air bag module operates to deploy the air bag at the onset of a vehicle collision. Specifically, at the onset of a collision, the inflator generates or releases large quantities of gas under relatively high pressure. The gas deploys the air bag by forcing the air bag out of the receptacle and inflating the air bag.

The cover of the module must be incorporated into the module in such a way that the cover does not impede the rapid and efficient deployment of the air bag. Specifically, the cover must be adapted either to separate from the receptacle or to rupture so as to enable the air bag to inflate outward from the receptacle. However, the cover should also be designed so that it does not fly away from the module unrestrained or fracture into pieces which fly away from the module unrestrained.

One known technique for incorporating a cover into an air bag module is to fasten the edge of the cover directly to the receptacle. The center of the cover is weakened so that the cover separates under pressure to permit the outward deployment of an air bag. However, the edge of the cover is intended to remain fastened to the receptacle, to prevent the segments of the cover from flying away from the receptacle. Examples of such a technique are disclosed in U.S. Pat. Nos. 4,810,005 to Fohl and 3,938,826 to Giorgini, et al.

Another known technique for incorporating a cover into an air bag module is to attach the cover directly to the surface of the air bag in such a way that the cover is effectively an integral part of the air bag. With such a technique, the entire cover separates from the receptacle along with the air bag. Examples of such a technique are disclosed in U.S. Pat. Nos. 3,945,665 to Tsutsumi, et al. and 3,624,810 to Hass. In each of these patents, the edge of the cover is sewn to the air bag, so that the cover effectively becomes part of the air bag. Expansion of the air bag material, however, can apply significant stresses to the entire cover and especially to the stitching that attaches the edge of the cover to the air bag. The cover and the stitching have to be designed to resist fracture of the cover and separation of the cover from the air bag under such expansion stresses.

Still another known technique for incorporating an air bag cover into an air bag module is a tether connected between the cover and the receptacle. U.S. Pat. Nos. 3,944,250 to Wulf, et al. and 3,968,979 to Schiesterl disclose such a technique. The Wulf, et al. patent shows a fabric band fastened at one end to a receptacle and at an opposite end to a cover. The Schiesterl patent discloses an elastic strip fastened to a cover and to a receptacle. Both patents use fasteners such as screws or rivets to secure the elastic strip or band to the receptacle. During deployment of the air bag, the cover separates as a unit from the receptacle. The tether is designed to maintain the cover connected to the receptacle. However, the tether appears to permit a fairly extensive range of movement of the cover as it separates from the receptacle.

Accordingly, applicants believe there is a need for new and useful ways to incorporate a cover into a vehicle air bag module to minimize further the possibility of the cover fracturing or flying away from the receptacle in an unrestrained manner during deployment of the vehicle air bag.

Moreover, applicants believe that to meet the growing demand for air bag modules, there is a continuing need to provide module structures which can be produced by mass production techniques.

SUMMARY OF THE INVENTION

The present invention provides a new and useful tether structure for incorporating a cover into a vehicle air bag module. The tether structure is designed to minimize the risk of the cover fracturing or flying away from the receptacle in an unrestrained manner during deployment of a vehicle air bag. Moreover, the tether structure is believed to be capable of being constructed and incorporated into an air bag module by mass production techniques.

According to the invention, a vehicle air bag module comprises a receptacle for a folded air bag. The tether structure couples a cover to the receptacle and to the vehicle air bag. The tether structure is designed so that during deployment of the air bag, the cover immediately separates from the receptacle but remains tethered to the air bag. Moreover, the tether structure is designed to allow a controlled, predetermined range of movement of the cover relative to the air bag.

According to the preferred embodiment, the tether structure has a locator structure integrally formed with the tether structure. The locator structure engages a portion of the receptacle to position the cover properly on the module during normal operation of a vehicle. The locator structure also allows immediate separation of the cover from the receptacle when the air bag begins to deploy. The tether structure maintains the air bag tethered to the cover during continued deployment of the air bag. Moreover, the tether structure allows a controlled, predetermined range of movement of the cover relative to the air bag and the vehicle.

Additional features of the present invention will become further apparent from the following detailed description and the accompanying drawings.

DESCRIPTION OF THE DRAWINGS

FIGS. 3a and 3b schematically illustrate two positions of the cover relative to the air bag and the receptacle during deployment of the air bag.

DETAILED DESCRIPTION OF THE PREFERRED EMBODIMENT

Figure 1:
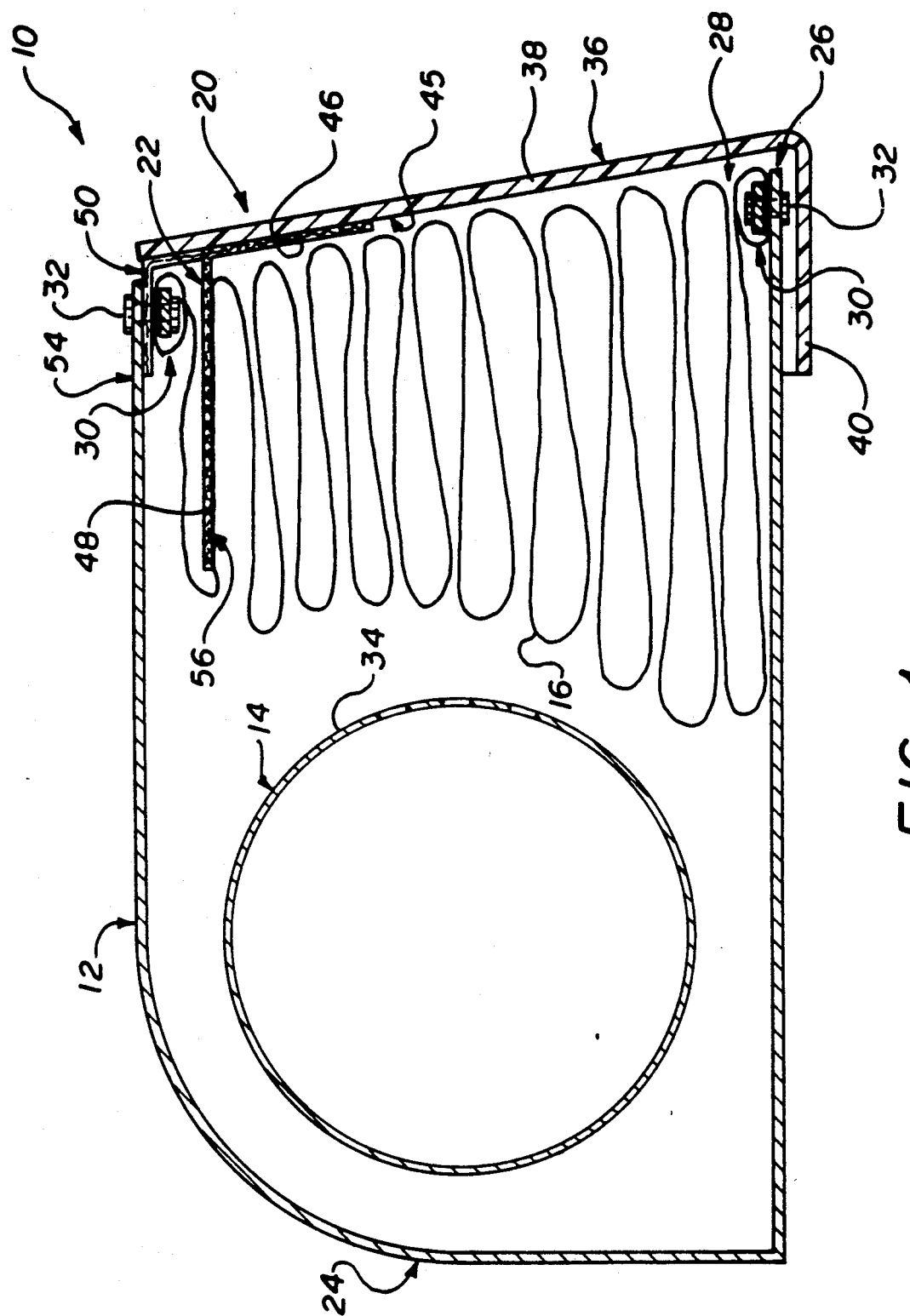
FIG. 1 is a schematic, sectional view of an air bag module constructed according to the present invention with portions omitted.

As illustrated in FIG. 1, a vehicle air bag module 10 comprises a receptacle 12 which receives an inflator (shown schematically at 14) and a folded air bag 16. A cover 20 is coupled to the receptacle 12 to close the receptacle. The cover 20 is coupled to portions of the air bag 16 by a tether structure 22 constructed according to the principles of the invention. The tether structure 22 maintains the cover 20 tethered to the air bag and confines the cover to a predetermined range of movement relative to the air bag 16 and to the other components of the module 10 during deployment of the air bag 16 from the module 10.

The module 10 is assembled outside of a vehicle and installed in the vehicle as a complete unit. When the module 10 is installed in a vehicle, the receptacle 12 is coupled to a structural portion of the vehicle. The receptacle 12 thus acts as a reaction device which transmits forces between the module 10 and the structural portion of the vehicle. The structure for coupling the receptacle 12 to a vehicle can be any of a number of known structures, including the structure illustrated in U.S. Pat. No. 4,842,300.

The receptacle 12 has a closed rear end 24 and a front end 26 with a deployment opening 28. The inflator 14 is located near the rear end 24 of the receptacle 12. The air bag 16, which is preferably made of a fabric such as nylon, is located near the front end 26 of the receptacle 12. The air bag 16 has a gas inlet opening (or mouth) 30 which is fixed to the part of the receptacle defining the deployment opening 28 by bolts 32 or similar fasteners.

The inflator 14 comprises a housing 34 that encloses a chemical mixture (not shown) and filter structure (not shown). At the onset of a collision, the chemical mixture is ignited and generates large quantities of an inert gas such as nitrogen. The gas is filtered and directed rapidly out of the inflator housing 34 and into the air bag 16. The gas directed into the air bag 16 causes the air bag to exert pressure on the cover 20. In turn, the pressure on the cover 20 causes the cover 20 to separate from the receptacle. This enables the air bag 16 to be deployed from the receptacle 12 (FIGS. 3a, 3b) and into the vehicle occupant compartment.

The inflator 14 can be any of a number of known constructions, including the construction illustrated in U.S. Pat. No. 4,696,705, which is a preferred construction. The inflator 14 is coupled to the receptacle 12 by means which are well known in the air bag art.

Figure 2:
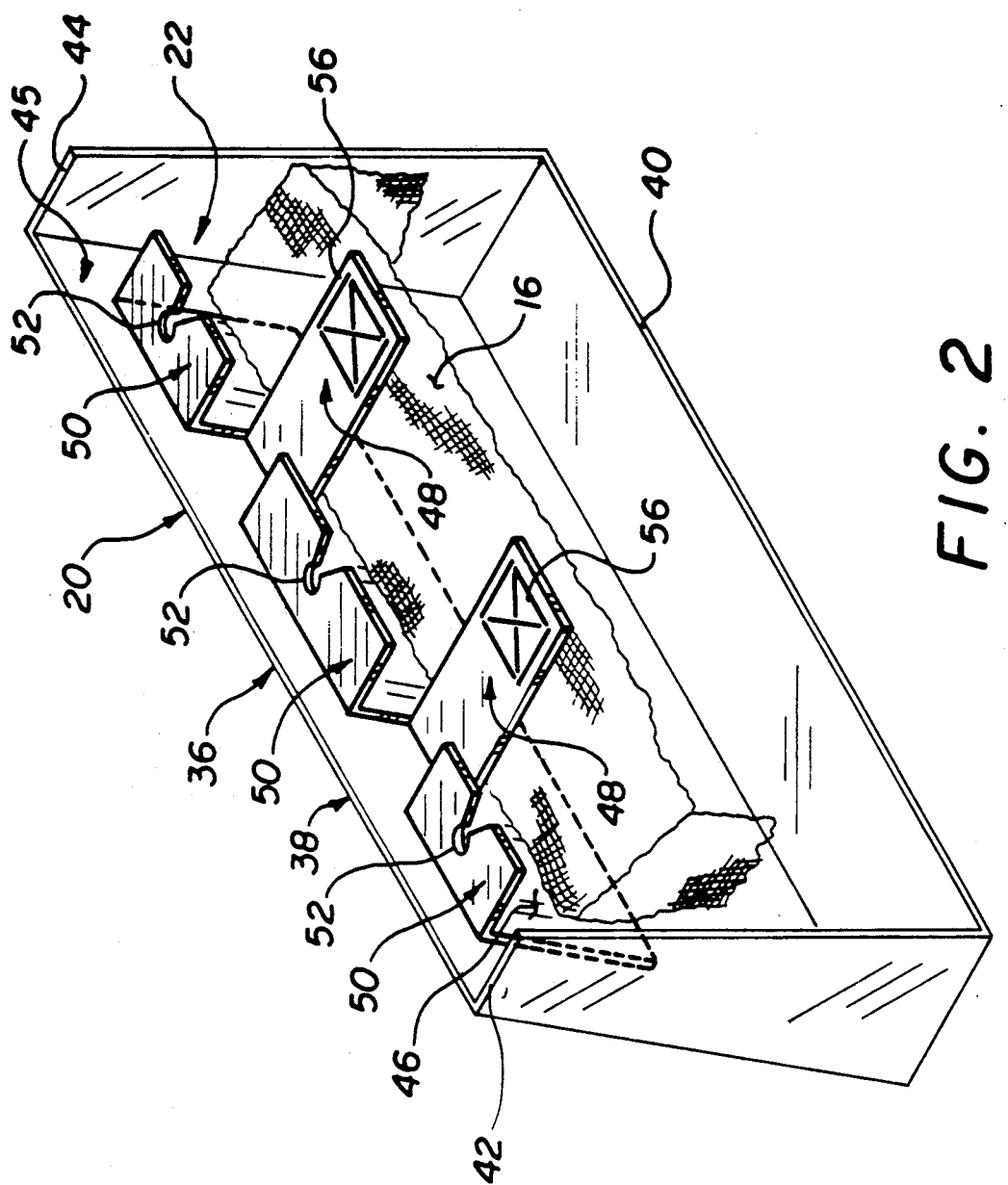
FIG. 2 is a schematic, perspective view of an air bag module cover and tether structure constructed according to the invention, taken from a rear corner of the cover.

The cover 20 comprises an outer shell 36. The shell 36 is a one piece member that is preferably formed of a compression moldable, tough thermoplastic material, such as polypropylene. The outer shell comprises a substantially planar main body 38, an integral flange 40 at the bottom of the main body 38, and integral side flanges 42, 44 (FIG. 2). When the cover 20 is incorporated into the module 10, the main body portion 38 substantially covers the deployment opening 28 of the receptacle 12. The side and bottom flanges 40, 42, 44 fit over the sides and the bottom of the receptacle 12.

The tether structure 22 is connected with a surface 45 of the cover 20 which faces the interior of the receptacle 12. The tether structure 22 comprises a base 46, a pair of flexible, tether straps 48, and a series of locator clips 50. The tether straps 48 and the locator clips 50 extend away from the base 46. The base 46, the tether straps 48, and the locator clips 50 are preferably integrally formed into one piece from a bicomponent staple polyester/polypropylene fiber having the following properties:

| denier | 6 |
| tenacity | 3.6 |
| elongation | 62 |
| staple length | 2.5 inches |

The tether straps 48 could, however, be formed of nylon fabric (840 denier) of the type used to form the air bag. If the tether straps were formed of nylon fabric, they would be sewn to the base 46, using a "Box X" stitch pattern, with a stitch density of about five (5) stitches per inch. Increasing the stitch density beyond five stitches per inch between the nylon tether strap and the bicomponent base 46 may result in separation, or "zippering" of the tether from the base upon deployment of the air bag.

The tether structure 22 is connected to the cover 20. The bicomponent fibrous material forming the tether structure may be bonded directly to the surface 45 of the plastic outer shell 36, by compression molding the bicomponent fibrous material with the outer shell 36 in a suitable temperature range. Alternatively, a layer of the bicomponent fibrous material can be compression molded to the outer shell 36 to form a batting. The fibrous material forming the tether structure can then be induction welded to the batting on the shell. Induction welding can be accomplished with a urethane hot melt adhesive that includes metallic fibers that is sold under the product designation Emaweld PP05H by Emaweld Division of Ashland Chemical Company, Norwood, New Jersey.

The locator clips 50 define slotted, resilient clip members 52. The slotted, resilient clip members 52 are adapted resiliently to clip onto the bolts 32 which couple the air bag 16 to the top 54 of the receptacle 12 (see FIG. 1). The clip members 52 properly position and retain the cover 20 on the receptacle 12 when the module 10 is being assembled, and during normal operation of a vehicle. However, the clip members 52 enable the cover 20 to detach immediately from the receptacle 12 when the air bag 16 begins to deploy from the receptacle 12.

The distal ends 56 of the tether straps 48 are sewn to the air bag 16. Preferably, the tether straps 48 have a predetermined length and are sewn to the air bag 16 in a "Box X" stitch pattern. In the preferred embodiment, wherein the tether straps 48 and the locator clips 50 are integrally formed of a bicomponent fiber, the tether straps 48 are sewn to the air bag 16 using a stitch density of around five (5) stitches per inch. Increasing the stitch density beyond five (5) stitches per inch between the tether straps and the air bag may result in separation, or "zippering", of the tethers from the air bag material upon inflation of the air bag. When the tether straps 48 are formed of nylon fabric of the type used to form the air bag, "zippering" presents less of a problem and the stitch density can be increased to ten (10) stitches per inch.

Figure 3A:
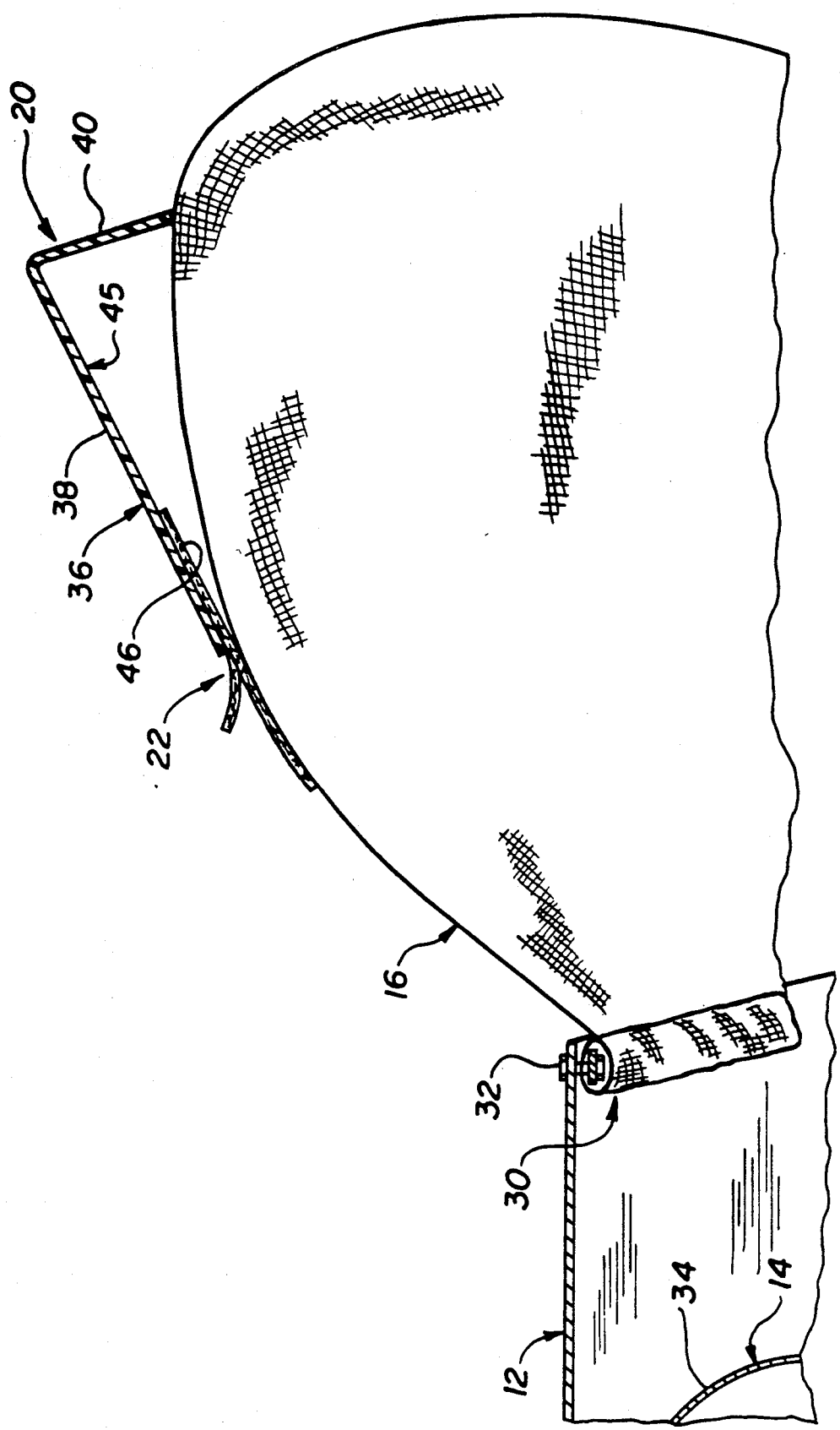

The tether straps 48 are flexible enough so that during deployment of the air bag 16, the straps 48 can bend from the position shown in FIG. 3a to the position shown in FIG. 3b. Moreover, the tether straps 48 are sewn to locations on the air bag 16 which are relatively close to the receptacle 12 so as to limit the maximum distance the cover can be separated from the receptacle, but yet far enough away from the receptacle that the cover 20 can pivot with the tether straps 48 from the position of FIG. 3a to the position of FIG. 3b without impacting a structural part of the vehicle.

With the tether structure 22, as soon as the air bag 16 begins to deploy, the locator clips 50 disengage from the receptacle 12, so that the cover 20 disengages immediately from the receptacle 12. The air bag 16 is forced out of the receptacle 12 and inflated. The tether straps 48 retain the cover 20 attached to the air bag 16, but allow the cover to pivot over a controlled predetermined range (i.e., from the position of FIG. 3a to the position of FIG. 3b). That controlled, predetermined range is designed so as not to allow the cover 20 to impact the vehicle interior during deployment of the air bag.

The construction of the air bag module cover 20 according to the present invention has been described in its preferred form. However, with the present disclosure in mind, it is believed that obvious alternatives to the preferred embodiment to achieve comparable advantages in other air bag module covers will become apparent to those of ordinary skill in the art.

What is claimed is:

1. An air bag module for a vehicle, comprising:
   a receptacle;
   a folded air bag in the receptacle, said air bag being positioned to be deployed from aid receptacle in an emergency situation;
   a cover which closes said receptacle; and
   tether structure coupled to said cover and to said air bag, said tether structure enabling said cove to separate from said receptacle and maintaining said cover tethered to said air bag as said air bag is being deployed from said receptacle.

2. An air bag module as set forth in claim 1, wherein said tether structure includes a locator portion which engages said receptacle to couple said cover with said receptacle in a predetermined position relative to aid receptacle when said air bag is in said receptacle, said locator portion separating from said receptacle when said air bag is being deployed from said receptacle.

3. An air bag module as set forth in claim 2, wherein said locator portion comprises a resilient clip which engages a portion of said receptacle to couple said cover with said receptacle.

4. An air bag module as set forth in claim 1, wherein said tether structure includes at least one flexible tether strap coupled to said cover and to said air bag.

5. An air bag module as set forth in claim 4, wherein said tether strap enables said cover to pivot relative to said air bag over a predetermined range of motion.

6. An air bag module as set forth in claim 5, wherein said tether strap is sewn to said air bag.

7. An air bag module as set forth in claim 6, wherein said tether strap is sewn to said air bag using a "Box X" pattern with no more than ten stitches per inch.

8. An air bag module as set forth in claim 7, wherein said tether strap comprises a nylon fabric strap.

9. An air bag module as set forth in claim 7, wherein said tether strap comprises a bicomponent staple fibrous material which is sewn to said air bag using a "Box X" pattern with no more than five stitches per inch.

10. An air bag module as set forth in claim 9, where said tether structure is integrally formed of the bicomponent staple fibrous material.

11. An air bag module as set forth in claim 10, wherein said tether structure is coupled to said cover by inductive welding.

12. An air bag module for a vehicle, comprising:
    a receptacle;
    a folded air bag in the receptacle, said air bag being positioned to be deployed from said receptacle in an emergency situation;
    a cover which closes said receptacle; and
    tether structure coupled to said dover and to said air bag, said tether structure enabling said cover to separate from said receptacle and maintaining said cover tethered to said air bag as said air bag is being deployed from said receptacle;
    wherein said locator portion comprises a resilient clip which engages a portion of said receptacle to couple said cover with said receptacle;
    wherein said air bag module further includes fastening means for fastening a predetermined portion of said air bag to said receptacle, and said resilient clip engaging a portion of said fastening means to couple said cover with said receptacle.

13. An air bag module for a vehicle, comprising:
    a receptacle;
    a folded air bag in the receptacle, said air bag being positioned to be deployed from said receptacle in an emergency situation;
    a cover which closes said receptacle; and
    tether structure coupled to said cover and to said air bag, said tether structure enabling said cover to separate from said receptacle and maintaining said cover tethered to said air bag as said air bag is being deployed from said receptacle;
    wherein said tether structure includes a locator portion which engages said receptacle to couple said cover with sad receptacle in a predetermined position relative to said receptacle when said air bag is in said receptacle, said locator portion separating from said receptacle when said air bag is being deployed from said receptacle; and
    wherein said tether structure includes (a) at least one flexible tether strap coupled to said cover and to said air bag, and (b) a bicomponent staple fibrous material forming a base and said locator portion, said tether strap being sewn to said bicomponent staple fibrous material to complete said tether structure.

14. An air bag module as set forth in claim 13, wherein said tether strap comprises a nylon fabric strap.

15. Apparatus comprising (a) a cover for a vehicle air bag module and (b) tether structure coupled to said cover and (c) means for coupling said tether structure to a vehicle air bag in a manner which maintains said cover tethered to the air bag as the air bag is being deployed from the vehicle air bag module.

16. Apparatus as set forth in claim 15, wherein said tether structure includes a locator portion for engaging a selected portion of the vehicle air bag module to couple said cover to said selected portion, said locator portion separating from the selected portion of the vehicle air bag module when the air bag is being deployed therefrom.

17. Apparatus as set forth in claim 16, wherein said locator portion comprises a resilient clip for engaging the selected portion of the vehicle air bag module to couple said cover with the selected portion of the vehicle air bag module.

18. Apparatus as set forth in claim 15, wherein said tether structure includes at least one flexible tether strap having a first portion coupled to said cover and a second portion for coupling to a vehicle air bag.

19. Apparatus as set forth in claim 18, wherein said tether strap enables said cover to pivot relative to an air bag to which it is coupled over a predetermined range of motion.

20. Apparatus as set forth in claim 19, wherein said second portion of said tether strap is to be sewn to an air bag.

21. Apparatus as set forth in claim 20, wherein said tether strap comprises a nylon fabric strap.

22. Apparatus as set forth in claim 20, wherein said tether strap comprises a bicomponent staple fibrous material.

23. Apparatus as set forth in claim 22, wherein said tether structure is integrally formed of the bicomponent staple fibrous material.

24. Apparatus as set forth in claim 23, wherein said tether structure is coupled to said cover by inductive welding.

25. Apparatus comprising (a) a cover for a vehicle air bag module and (b) tether structure coupled to said cover and (c) means for coupling said tether structure to a vehicle air bag in a manner which maintains said cover tethered to the air bag as the air bag is being deployed from the vehicle air bag module;

wherein said tether structure includes a locator portion for engaging a selected portion of the vehicle air bag module to couple said cover to said selected portion, said locator portion separating from the selected portion of the vehicle air bag module when the air bag is being deployed therefrom; and wherein said tether structure includes (a) at least one flexible tether strap coupled to aid cover and to said air bag and (b) a bicomponent staple fibrous material forming a base and said locator portion, said tether strap being sewn to said bicomponent staple fibrous material to complete said tether structure.

26. Apparatus as set forth in claim 25, wherein said tether strap is sewn to said base using a "Box X" stitch pattern with no more than five stitches per inch.

27. Apparatus as set forth in claim 25, wherein said tether strap comprises a nylon fabric strap.

* * * * *

UNITED STATES PATENT AND TRADEMARK OFFICE
CERTIFICATE OF CORRECTION

PATENT NO. : 5,242,191
DATED : September 7, 1993
INVENTOR(S) : Faigle, et al

It is certified that error appears in the above-indentified patent and that said Letters Patent is hereby corrected as shown below:

Column 5, line 35, delete "aid" and insert --said--.

Column 5, line 39, delete "cove" and insert -- cover --.

Column 5, line 46, delete "aid" and insert -- said --.

Column 6, line line 15, delete "dover" and insert -- cover --.

Column 6, line 42, delete "sad" and insert -- said --.

Column 8, line 17, delete "aid" and insert -- said --.

Signed and Sealed this

Fifth Day of April, 1994

Attest:

BRUCE LEHMAN

*Attesting Officer*     *Commissioner of Patents and Trademarks*